United States Patent [19]

Boulais

[11] Patent Number: 4,727,374
[45] Date of Patent: Feb. 23, 1988

[54] AERIAL SURVEYING SYSTEM

[76] Inventor: Richard A. Boulais, 10314 W. Montecito, Phoenix, Ariz. 85039

[21] Appl. No.: 338,315

[22] Filed: Jan. 11, 1982

Related U.S. Application Data

[60] Continuation of Ser. No. 135,305, Mar. 31, 1980, abandoned, which is a division of Ser. No. 3,704, Jan. 15, 1979, Pat. No. 4,230,665.

[51] Int. Cl.$^4$ .......................... G01S 13/74; G01S 13/89
[52] U.S. Cl. ...................................... 342/50; 342/191; 356/4; 356/152
[58] Field of Search ................... 343/5 CM; 356/1, 4, 356/152; 342/191, 42, 50

[56] References Cited

U.S. PATENT DOCUMENTS

| | | | |
|---|---|---|---|
| 3,191,170 | 6/1965 | Lustig et al. | 343/5 R |
| 3,213,451 | 10/1965 | Alpers | 343/5 R |
| 3,743,418 | 7/1973 | Heflinger | 356/5 |
| 3,817,620 | 6/1974 | Suzaki et al. | 356/1 |
| 3,918,172 | 11/1975 | Moreau | 356/1 |
| 4,050,067 | 9/1977 | Elmore | 343/5 CM |

FOREIGN PATENT DOCUMENTS 1399441  7/1975  United Kingdom ................ 356/152

OTHER PUBLICATIONS

"Geodolite" Brochure, Spectra-Physics, 3-1968.

*Primary Examiner*—Stephen C. Buczinski
*Attorney, Agent, or Firm*—Nissle & Leeds

[57] ABSTRACT

An aerial survey method to determine ground contours establishes a reference plane to which all contour measurements are referred. The reference plane intersects a rotating beam optical radar unit which includes a receiving antenna. The antenna receives signal waves emanating from the aircraft to measure the relative height of the aircraft with respect to the reference plane. A survey track along the ground for the aircraft is determined and the position of the aircraft along the track is continuously measured. The aircraft is flown continuously along the track and repeated altitude measurements of the aircraft are made. The relative height of the aircraft with respect to the reference plane, the altitude of the aircraft above the ground and the position of the aircraft along the survey track are correlated to determine the ground contours.

1 Claim, 3 Drawing Figures

AERIAL SURVEYING SYSTEM

This application comprises a continuation of my copending U.S. application Ser. No. 135,305 for "AERIAL SURVEYING SYSTEM" filed Mar. 31, 1980 and now abandoned. U.S. application Ser. No. 135,305 comprises a division of U.S. application Ser. No. 3,704 for "AERIAL SURVEYING SYSTEM ESTABLISHING A HORIZONTAL REFERENCE PLANE TO DETERMINE GROUND CONTOURS", filed Jan. 15, 1979, now U.S. Pat. No. 4,230,665.

The invention relates to an improved system for aerial surveying.

In another respect, the invention relates to an aerial surveying system comprising components which are utilized to establish an imaginary horizontal reference plane, the reference plane being used to determine ground contours.

In a more specific respect, the invention relates to an aerial surveying system which utilizes electromagnetic transmission and receiving devices to establish an imaginary horizontal reference plane from which ground contours are determined.

In a further important respect, the invention relates to an aerial surveying system which utilizes optical radar to define the horizontal reference plane from which ground contours are determined.

Aerial surveying techniques utilizing ground based equipment are well known in the art. U.S. Pat. No. 3,918,172 and Australian patent No. 1,399,441 each disclose a laser-assisted assisted helicopter surveying system in which a laser beam is used to mark the hover position of a helicopter and telemetry is then used to locate both the helicopter and the laser source. Conventional surveying techniques are utilized in conjunction with the hovering position of the helicopter as a reference.

The patents to Alpers U.S. Pat. No. 3,213,451 and to Lustig U.S. Pat. No. 3,191,170 are basically radar systems, though Lustig makes use of a compensated barometric altimeter by which he attempts to maintain the aircraft at a constant reference altitude during the course of the aircraft's flight.

Suzaki U.S. Pat. No. 3,817,620 combines triangulation and transmit times to determine the location of both an aircraft and undetermined earth locations with respect to known earth locations.

In Pat. No. 3,743,418, Heflinger obtains a contour map comprised of light and dark contour lines. He illuminates the ground with pulses of light. He views the reflected light through a shutter synchronized to the light pulses. Reflected light is admitted or rejected at the shutter dependent upon the round-trip transit time of the light. The accuracy of this contour plot will depend upon the control of the pilot in maintaining altitude and, unless other equipment is added, the pilot will have no knowledge of the actual elevation of his contour lines.

U.S. Pat. No. 3,918,172 to Moreau discloses an aerial survey method employing four different systems—a microwave system to measure distance from a known reference point, a strobetheodolite system to measure azimuth, a laser-mirror system to locate the aircraft above a known point on the ground and an infrared reflector or a plumb bob system to measure the height of the aircraft above the known point. Moreau does not disclose a method in which the aircraft is continuously moved along a survey track while making continuous instantaneous measurements of ground elevation. Rather, Moreau must first locate a point on the ground utilizing the microwave and strobe systems, then place ground-located equipment at the point of measurement, and then make the elevation measurement and then repeat the entire process of point selection and location, placement of ground-located equipment at the point selected and make the ground elevation measurement.

Accordingly, it would be highly desirable to provide an imp-oved aerial surveying system in which an aircraft continuously moves along a survey track while making continuous instantaneous measurements of ground elevation.

It is, therefore, an object of the present invention to provide an improved aerial surveying system.

A further object of the invention is to provide ground-based equipment which will coordinate with airborne equipment to correlate aircraft altimeter readings and spacial locations to define a horizontal reference plane in space.

Another object of the invention is to utilize ground-based optical radar to obtain instantaneous slant range and elevation angle data for an aircraft, the data being utilized to establish a horizontal reference plane to which altimeter measurements are referred to determine ground contours.

Still another object of the invention is to provide an aerial surveying system which is economical to manufacture and yet highly accurate and simple to use.

These and other objects and advantages of the invention will be apparent to those skilled in the art from the following detailed description thereof, taken in conjunction with the drawings in which.

Briefly, in accordance with my invention, I provide an improved aerial surveying method for determining ground contours. The method comprises the steps of collecting data by positioning a radar unit at a known point on the ground; defining an imaginary reference plane with respect to the radar unit; establishing a survey track for an aircraft along the ground and continuously moving the aircraft along the track, the aircraft including an altimeter for measuring the height of the aircraft above the ground; simultaneously continuously determining the position of the aircraft at selected times $T_1, T_2, T_3 \ldots T_n$ as the aircraft continuously moves along the survey track, utilizing the radar unit to measure the range and elevation of the aircraft with respect to the radar unit at the selected instants in time $T_1, T_2, T_3 \ldots T_n$ as the aircraft continuously moves along the track, and utilizing the altimeter to determine the height of the aircraft above the ground at the selected times $T_1, T_2, T_3 \ldots T_n$ and, correlating the range, elevation, position and height of the aircraft above the ground at each of the selected instants in time $T_1, T_2, T_3 \ldots T_n$ to determine the distance from the reference plane to the ground for the location of the aircraft at each of the instants in time; and developing ground contours from the reference plane to ground distances calculated by correlating the range, elevation, position and height of the aircraft above the ground at each of the selected instants in time $T_1, T_2, T_3 \ldots T_n$.

The invention is particularly useful in those instances in which the ground contours are such that the established horizontal reference plane and certain ground features intersect. In such an instance, a line of sight along said horizontal reference plane would frequently be impossible between the aircraft and the equipment used to generate the horizontal reference plane. My improved method of aerial surveying utilizes a ground based optical radar in correlation with a transponder mounted on the aircraft to obtain the slant range and elevation angle of the aircraft. The slant range and elevation angle are used to establish the aircraft's position above or below the designated horizontal reference plane. Altimeter measurements are made and synchronized to transponder activation as the radar beam is intercepted by the transponder. The location of the aircraft is simultaneously tracked and recorded by a radio base line position determining system, by triangulation using rotating laser beams, or by the optical radar unit itself. When rotating laser beams are employed, the beams are modulated, both for identification and to prevent interference from other laser units in the vicinity. Correlation of the altimeter measurements and the aircraft's elevation with respect to the reference plane is then accomplished to determine ground contours with respect to said reference plane.

Figure 1:
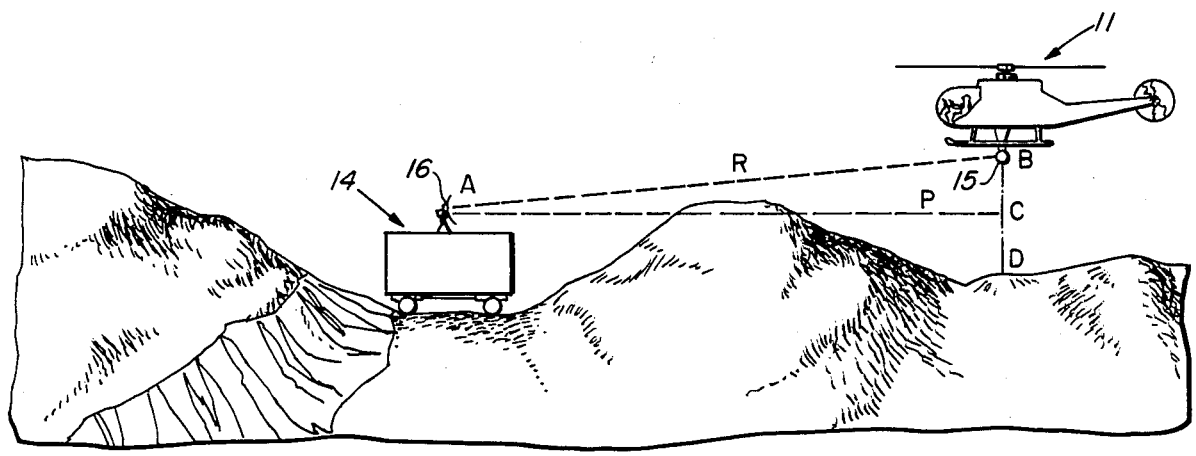
FIG. 1 illustrates the presently preferred embodiment of the invention utilizing an optical radar whereby the helicopter position is established in space and ground contours may be established with respect to an imaginary horizontal reference plane despite lack of a direct line of sight between the helicopter and ground radar.
Figure 3:
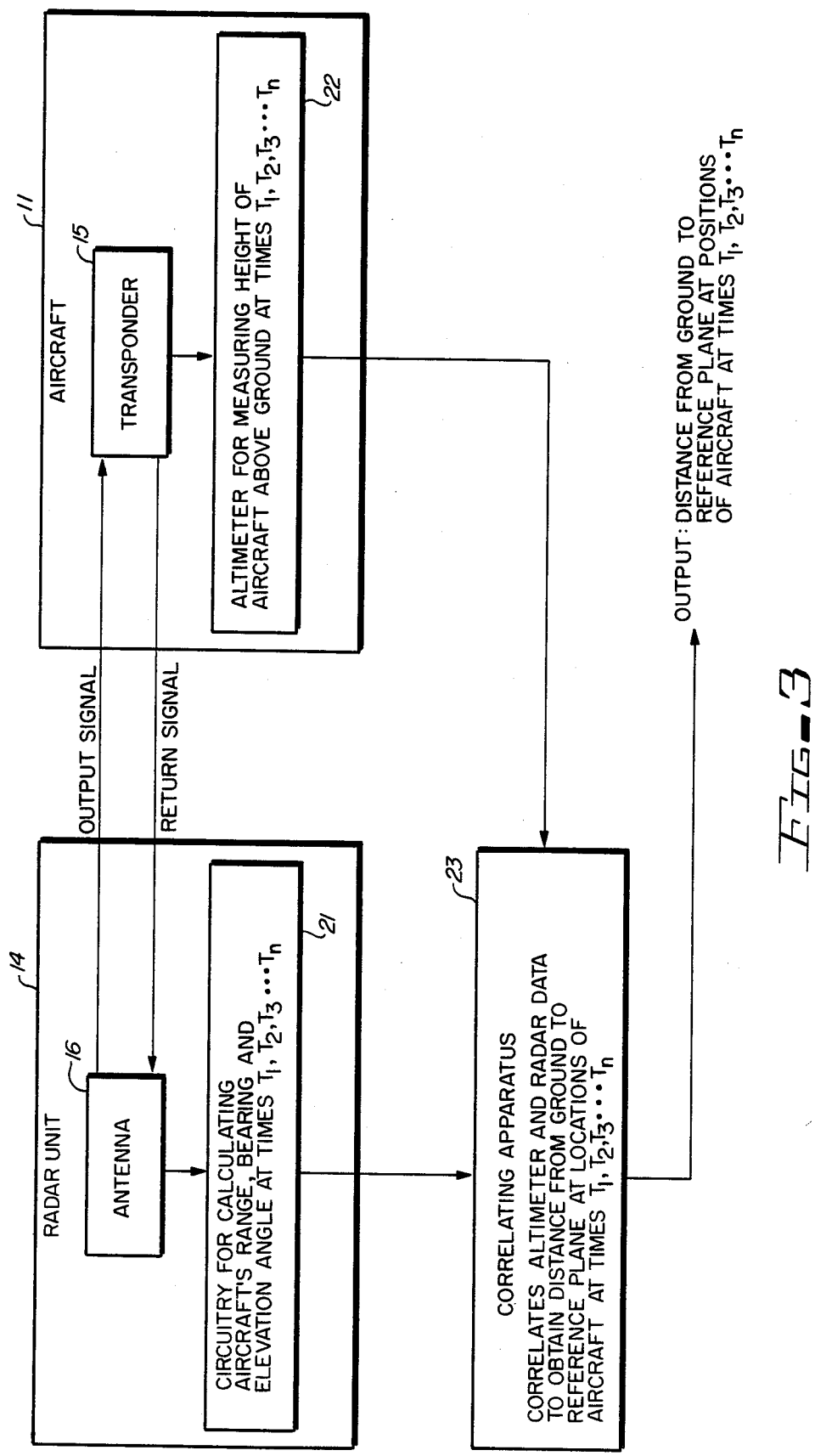
FIG. 3 is a schematic representation of the interrelationship of the equipment utilized in the presently preferred embodiment of the invention.

Turning now to the drawings, which depict the presently preferred embodiment of the invention for the purpose of illustrating the practice thereof and not by way of limitation of the scope of the invention, FIG. 1 illustrates the presently preferred embodiment of the invention including optical or line-of-sight radar 14 equipped with tracking antenna 16. An imaginary horizontal reference plane, indicated by line P in FIG. 3, is defined as the plane swept by the beam of antenna 16 if the beam were a narrow pencil beam and the antenna were rotated at a zero elevation angle. During normal operation of the system of FIG. 1 antenna 16 is normally rotated or maintained at an elevation angle greater than zero and has a fan-shaped beam which diverges as it travels away from radar unit 14. Radar 14 permits the determination of the longitude and latitude of helicopter 11 at any instant $T_1, T_2, T_3 \ldots T_n$ in time. Baseline triangulation or other prior art techniques may also be utilized to determine the position of aircraft 11 at a given instant in time.

Aircraft 11 is equipped with transponder 15 which receives and is responsive to signals emitted by optical radar 14. Transponder 15, acting in cooperation with radar 14, permits the determination of the slant range or distance R from antenna 16 to aircraft 11 at a particular instant $T_1, T_2, T_3 \ldots T_n$ in time. Many existing radars have the capability to determine slant range R without the use of transponder 15. The look angle BAC of antenna 16 is equivalent to the azimuth or elevation angle of aircraft 11.

Aircraft 11 makes an altitude measurement BD at each instant in time $T_1, T_2, T_3 \ldots T_n$ transponder 15 is interrogated by radar 14 and slant range R and angle BAC are determined. Since Triangle BAC is a right triangle, knowing the hypotenuse R and angle BAC of the triangle enables the trigonometric calculation of side BC of the triangle to be made for each position of the helicopter. Subtracting the distance BC of aircraft 11 above imaginary reference plane P from altitude BD of aircraft 11 at a particular instant in time $T_n$ gives the height CD of reference plane P above the ground for the position of aircraft 11 at that instant in time $T_n$.

In operation of the system, a survey track is established for the section of land to be surveyed. While an aircraft flies along the survey track instantaneous elevation readings BD are continuously taken by an altimeter aboard the aircraft at selected times $T_1, T_2, T_3 \ldots T_n$. At each instant in time $T_n$ radar unit 16 and transponder 15 are utilized to determine the range R, elevation angle BAC and bearing of aircraft 11. As earlier described, this data is correlated to determine the distance CD from the ground to reference Plane P at the position of helicopter 11 at each instant in time $T_1, T_2, T_3 \ldots T_n$.

Figure 2:
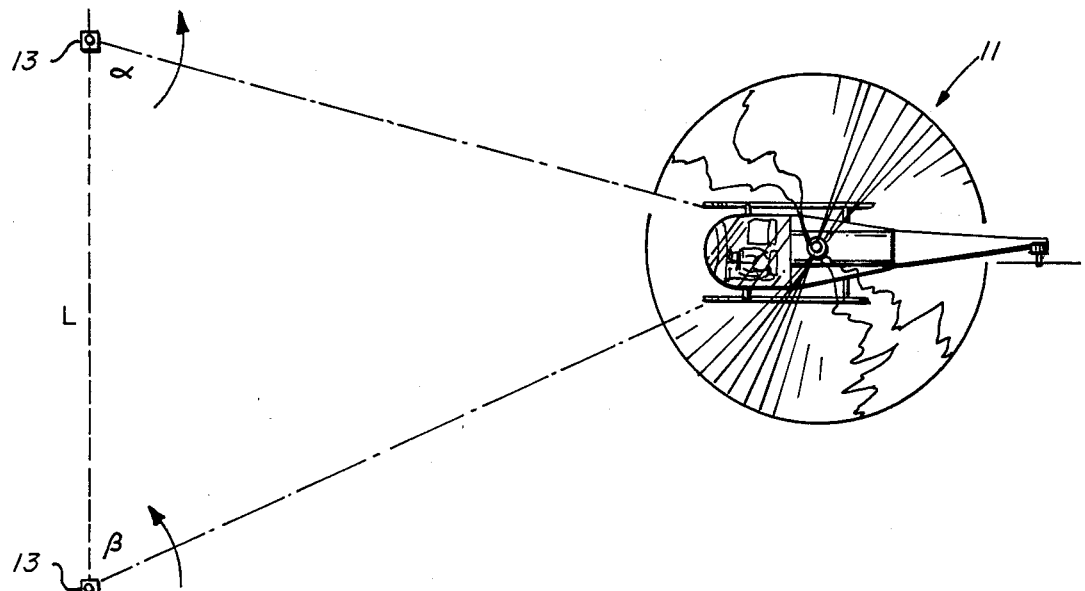
FIG. 2 is an illustration of the manner in which two spaced signals may be utilized to triangulate the position of a survey aircraft.

Baseline triangulation techniques, illustrated in FIG. 2, are well known in the prior art and may also be employed to provide the instantaneous location of the aircraft along the survey track. In baseline triangulation at least two angle-determining devices 13 are located a known distance apart along an established baseline L. With the baseline distance known and the line-of-sight angular dispositions alpha and beta determined, trigonometry is utilized to determine the location of aircraft 11 Modern electronic positioning systems provide the means to quickly, easily and inexpensively permit a pilot to determine exactly where to start on a survey track, to maintain his course, and to establish exactly where he left his designated survey track if he should have to interrupt his survey flight to refuel.

The Mini-Ranger (TM) III position-determining system by Motorola Incorporated of Scottsdale, Ariz. is an electronic baseline triangulation positioning system of the type noted above. The lightweight, low power Mini-Ranger system uses a small receiver/transmitter installed in the aircraft. This receiver/transmitter works with two or more portable battery-operated reference stations located at known points near the survey site. The system measures distances to the unattended reference stations, automatically computes the location of the aircraft, and then outputs course error data to the pilot on an indicator which allows accurate steering control and correction. In operation, a pilot can quickly establish and readily follow a survey flight pattern suited to the area to be covered. He can also, when necessary, leave the track and later readily return to the exact point at which he departed from the track.

What I have described is the technique and apparatus for establishing a horizontal reference plane with reference to which aerial surveying measurements may be made so as to determine ground contours in the survey area. It should be noted that with reciprocal devices, the decision to place a piece of equipment either on the aircraft or on the ground is a matter determined by the preferences of the designer.

Although I have used the term "horizontal reference plane" in explaining the presently preferred embodiment and best mode of the invention, such usage should not be considered a limitation of the invention. Instances could arise in which it would be advisable that the imaginary reference plane be established at an angle with respect to a true horizontal plane. Similarly, the plane, since it is imaginary, could be positioned above or below radar unit 16. Final contour readings would then have to be corrected to account for the effects of tilting or otherwise repositioning the reference plane.

The innovative concept, however, remains the same: a continuously moving aircraft is instantaneously located at times $T_1, T_2, T_3 \ldots T_n$ with respect to the established reference plane. The altitude of the aircraft above the ground at each of the instants in time $T_1, T_2, T_3 \ldots T_n$ is correlated with its position BC with respect to the reference plane to determine the distance from the ground to the reference plane for the position of the aircraft at each instant in time $T_1, T_2, T_3 \ldots T_n$. When an on-board aircraft altimeter is utilized to determine the aircraft's altitude above the ground, an accurate laser altimeter is preferred.

FIG. 3 further depicts the interrelationship of radar unit 14; antenna 16 of unit 14; circuitry 21 for calculating range, bearing and elevation angle of aircraft 11; transponder 15 of aircraft 11; altimeter 22; and correlation apparatus 23.

Having described my invention in such terms as to enable those skilled in the art to understand and practice it, and having identified the presently preferred embodiment and best mode thereof, I claim:

1. A method of aerial surveying to determine ground contours comprising, in combination, the steps of:
   (a) collecting data by
      (i) positioning a radar unit at a known point on the ground;
      (ii) defining an imaginary reference plane with respect to said radar unit;
      (iii) establishing a survey track for an aircraft along the ground and continuously moving said aircraft along said track, said aircraft including an altimeter for measuring the height of of said aircraft above the ground;
      (iv) simultaneously, continuously
         determining the position of the aircraft at selected times $T_1, T_2, T_3 \ldots T_n$ as said aircraft continuously moves along said survey track,
         utilizing said radar unit to measure the range and elevation of said aircraft with respect to said radar unit at said selected times $T_1, T_2, T_3 \ldots T_n$ as said aircraft continuously moves along said track, and
         utilizing said altimeter to determine the height of said aircraft at said selected times $T_1, T_2, T_3 \ldots T_n$, and
      (v) correlating the range, elevation, position and height of said aircraft above the ground at each of said selected instants in time $T_1, T_2, T_3 \ldots T_n$ to determine the distance from said reference plane to the ground for the location of said aircraft at each of said instants in time; and
   (b) developing ground contours from the reference plane to ground distances calculated in step (v).

* * * * *